UNITED STATES PATENT OFFICE.

CHARLES H. CAMPBELL, OF NEW YORK, N. Y.

MANUFACTURE OF CONDENSED MILK.

992,705.

No Drawing.

Specification of Letters Patent. Patented May 16, 1911.

Application filed December 9, 1909. Serial No. 532,182.

*To all whom it may concern:*

Be it known that I, CHARLES H. CAMPBELL, a citizen of the United States, residing in the borough of Manhattan, city, county, and State of New York, have invented certain new and useful Improvements in the Manufacture of Condensed Milk, of which the following is a specification.

According to this invention I purpose to make the condensed milk not from ordinary fresh milk but from a milk of which a part of the water has previously been extracted. Or in other words I purpose to divide the process into at least two stages. In the first stage the volume is reduced by the extraction of water and preferably without high heat, and in the second stage this concentrated milk is increased in volume by the coagulation of the albuminoids or by the addition of water, or in both ways.

This process has great commercial and technical advantages. The milk can be collected in a grazing country far from the center of manufacturing industries, and can be there treated to remove a large part of the water before being shipped to the place where it is condensed and marketed, thus saving the cost of shipping a large quantity of the water. This concentrated milk because of the small quantity of water in it, will keep fresh much longer than ordinary milk, and will thus bear shipment to a greater distance and at less expense. It can be perfectly controlled as to its contents of butter fat and water, so as to supply at the point where the last stage of the process is to be carried out, a milk which needs only to be heated to the coagulating point to give the desired final product. Or it may be reduced to such an extent that in the second stage it will require the addition of some water as well as the application of heat. There is for example such a concentrated milk now on the market known as White Cross Milk, of such a composition that by mixing one part of water with three parts of this milk and heating to the coagulating point, a condensed milk of the right thickness and of about twelve per cent. butter fat is obtained.

A specific example of the complete process is as follows:—A concentrated milk is first made in accordance with the processes described in the patent of Joseph H. Campbell, No. 668,161, and in my reissued patent No. 12,649. This concentrated milk is then shipped (or if the two stages of the process are to be carried out at the same place is kept for a convenient time) and subjected to the second stage of the process. In the first stage the milk was heated to a temperature maintained below the coagulating point of albumin, and concentrated by exposure to a blast of air in considerable volume, which removes the water so rapidly as to prevent souring. This process preserves the proteids or albuminoids in soluble and peptogenic condition. Preferably this process is continued until the milk is reduced to about one-fourth to one-sixth of its original volume. In that case the second stage of the process is performed by adding about one part of water to three parts of the concentrated milk, and heating to the coagulating temperature by injecting live steam into the mass, or by heating with a water jacket. The temperature must be at least high enough to coagulate the albuminoids, and in practice I have used temperatures of 185° to 190° F. This temperature is maintained for only a few minutes, sufficient to effect the desired extent of coagulation. The milk is then cooled, preferably by circulating a cooling medium through a jacket surrounding the vessel. During the heating and cooling it is kept in constant agitation. The water may be added either before or after the application of the coagulating heat or simultaneously therewith.

The process may be carried out from beginning to end with the same quantity of cream in the mass. Preferably, however, the quantity of cream in the final product is determined separately; the milk being first skimmed and then concentrated in the manner described, and the desired quantity of cream being mixed with the concentrated skim milk until the mass is reduced to a suitable emulsion, and without breaking up the fat globules. This is the process described in my reissue patent above referred to, and secures a product which is directly marketable, and which also is valuable for the manufacture of condensed milk.

While it is preferable for most uses that the final product contain a substantial quantity of butter fat, this is not essential. The material from which the condensed milk is made may be entirely or substantially lacking in cream, being a concentrated skim milk; and the subsequent concentration may be effected with or without the addition of cream at some suitable stage.

What I claim is:—

1. In the making of condensed milk, the heating of the milk to a temperature below the coagulating point of albumin, the simultaneous concentrating of it by exposure to air in such volume that it is concentrated so rapidly as to prevent souring and its proteids are preserved in soluble and peptogenic condition, the heating of the mass to a coagulating temperature, and the cooling of the mass while keeping it in agitation.

2. In the making of condensed milk, the concentrating of it to a thick fluid with application of heat at a temperature below the coagulating point of albumin, and the heating of the concentrated milk to a coagulating temperature.

3. In the making of condensed milk, the concentrating of skim milk to a thick fluid with application of heat at a temperature below the coagulating point of albumin, the mixing of cream with the concentrated skim milk, and the heating of the mass to a coagulating temperature.

4. In the making of condensed milk the performing of the process in two stages in the first of which the volume is reduced by extracting water, and in the second of which it is increased by coagulation of the albuminoids and the addition of water, in quantity at least equal to about one third of the reduced volume resulting from the first stage.

In witness whereof, I have hereunto signed my name in the presence of two subscribing witnesses.

CHARLES H. CAMPBELL.

Witnesses:
D. ANTHONY USINA,
FRED WHITE.